United States Patent
Litoiu et al.

(10) Patent No.: US 7,096,457 B2
(45) Date of Patent: Aug. 22, 2006

(54) PROMOTION OF FEATURES IN REUSABLE SOFTWARE COMPONENT TYPES

(75) Inventors: Marin Litoiu, Toronto (CA); Michael Starkey, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 717 days.

(21) Appl. No.: 10/319,241

(22) Filed: Dec. 13, 2002

(65) Prior Publication Data

US 2003/0159131 A1    Aug. 21, 2003

(30) Foreign Application Priority Data

Feb. 21, 2002   (CA)   .................................... 2372891

(51) Int. Cl.
*G06F 9/44*     (2006.01)
*G06F 15/00*    (2006.01)

(52) U.S. Cl. ...................... 717/120; 717/116; 717/104; 715/513

(58) Field of Classification Search ........ 717/100–123; 719/310, 315; 718/106
See application file for complete search history.

(56) References Cited

U.S. PATENT DOCUMENTS

| | | | |
|---|---|---|---|
| 4,943,932 A * | 7/1990 | Lark et al. ................... 706/60 |
| 6,269,473 B1 * | 7/2001 | Freed et al. ................. 717/104 |
| 6,298,475 B1 * | 10/2001 | Alcorn ........................ 717/118 |
| 6,574,791 B1 * | 6/2003 | Gauthier et al. ............ 717/107 |
| 6,601,234 B1 * | 7/2003 | Bowman-Amuah ......... 717/108 |
| 6,611,844 B1 * | 8/2003 | Saulpaugh et al. ......... 707/100 |
| 6,694,506 B1 * | 2/2004 | LeBlanc et al. ............. 717/108 |
| 6,694,507 B1 * | 2/2004 | Arnold et al. .............. 717/108 |
| 6,768,486 B1 * | 7/2004 | Szabo et al. ................ 345/420 |
| 6,789,252 B1 * | 9/2004 | Burke et al. ................ 717/100 |
| 6,868,538 B1 * | 3/2005 | Nixon et al. ................ 717/100 |
| 6,915,301 B1 * | 7/2005 | Hirsch ........................ 707/102 |

OTHER PUBLICATIONS

TITLE: Dynamic selection and reuse of implementations in the object-oriented programming paradigm, author: Al-Haddad et al, ACM, 1993.*
TITLE: Analyzing and measuring Reusability in Object-Oriented Designs, aurhor: Price et al, ACM, 1997.*

* cited by examiner

*Primary Examiner*—Antony Nguyen-Ba
(74) *Attorney, Agent, or Firm*—James E. Boice; Dillon & Yudell

(57) ABSTRACT

In the process of hierarchical composition of software component types, the reusability of software component types is improved through the "promotion of features". That is, a feature of an instance of a predetermined software component type may be promoted to a software component type containing instances of the predetermined software component type. The promoted feature may then be customized when the containing software component type is instantiated.

20 Claims, 5 Drawing Sheets

PROMOTION OF FEATURES IN REUSABLE SOFTWARE COMPONENT TYPES

BACKGROUND OF THE INVENTION

1. Field of the Invention

The present invention relates to reusable software component types and, in particular, to the promotion of features from instances of such software component types to others of such software component types.

2. Description of the Related Art

Software systems are built from pieces of software that interact with each other to accomplish a common goal. These pieces of software have different names, which may depend on the programming language in which the pieces are written and the abstraction level that is being considered. Examples of pieces of software include "procedures", "objects", "blocks", "processes".

To ease the maintainability of code and to improve the efficiency of creating code, in the process of building software programs, programmers build software component types that are reused through a process called "instantiation". Through this process of instantiation, an instance (a software component) of a software component type is created. An instance of a given software component type has all the "features" of the given software component type and these features may be customized for that instance. For example, if the given software component type has a feature "color", then, in the instance, the feature "color" may be customized to a particular color, e.g., "red". In this document, we understand a feature to have a name and a value.

These pieces of software may be composed of instances of reusable software component types. A software component type, or a template, may be called a "Part". Specifically, example parts are a C++ class, a Java™ Class, a Flow in Flow Composition Builder ("FCB", marketed by IBM of Armonk, N.Y.) or a meta-level (say, M2) in Meta Object Facility. Java is a trademark of Sun Microsystems. As will be apparent to a person skilled in the art, Meta Object Facility (MOF) is a standard from the Object Management Group (OMG) that builds on and extends the Extensible Markup Language (XML) and the Unified Modeling Language (UML). An instance of a reusable software component type (Part) may be called a "Sub-Part". Example Sub-Parts are a C++ object, a Java™ object, a FlowComponent in FCM or a meta-level (say, M1, where M1 an instance of M2) in MOF.

A Part may be built by aggregating instances of other Parts. Instances are considered as being constituent Sub-Parts of the Part and a Part is considered as being an aggregation of Sub-Parts. Parts which are being composed of an aggregation of a set of instances of other, predetermined Parts are called "Parts under composition". "Visual hierarchical composition though aggregation" is a process, typically used in tools for writing software, used to compose Parts from Sub-Parts. The process can be described with the visualization of two levels, a "Level 2" containing Parts and a "Level 1" containing Sub-Parts. Each Sub-Part on "Level 1" is an instance of a Part from "Level 2", that is, the behavior and structure of each Sub-Part is defined by the Part from which the Sub-Part is instantiated. Every Part can have many instances in "Level 1". New Parts may be composed through the aggregation of instances (Sub-Parts) of predetermined Parts.

Classically, features of Parts are customized in the creation of Sub-Parts. Consider a predetermined Part constructed with a "color" feature. When a user creates an instance (Sub-Part) of the predetermined Part, the user sets the color feature to a value, e.g., red. A Part under composition may subsequently include the red instance of the predetermined Part. When the user creates an instance of the Part under composition, the user does not have the opportunity to set the value of the color feature to anything but red nor does the user have the opportunity to remove the "color" feature from that instance.

Where two instances of the original Part under composition are required, each with a different color, the user would have had to compose two new Parts instead of one. The first of these new Parts under composition would be aggregated from the same set of instances of the other, predetermined Parts. The second of these new Parts under composition would be aggregated from most of the instances of the other, predetermined Parts with the exception that a differently colored instance of the aforementioned predetermined Part is used. Subsequently, a Sub-Part would be instantiated from each of the two new Parts.

Clearly, there is a need for a mechanism to allow customization of features of Parts (reusable software component types) upon instantiation that does not require the composition of further Parts.

SUMMARY OF THE INVENTION

While using hierarchical composition in a visual tool for building software component types, the reusability of the software component types may be improved through the promotion of features from instances of component types to component types. These component types are, as is standard, composed through the aggregation of instances of component types. Where a particular feature is promoted to a given component type, the feature of the given component type may be customized with respect to the particular feature when the given component type is instantiated. Advantageously, the ability to create a component type with the promoted feature eliminates the need to generate multiple versions of the component type, each version with the feature predetermined to have a desired value.

In accordance with an aspect of the present invention there is provided a method of improving reusability of a given software component type, where the given software component type is an aggregation of instances of a plurality of other software component types. The method includes promoting a given feature of at least one of the instances of the plurality of other software component types to the given software component type.

In accordance with another aspect of the present invention there is provided a method of improving reusability of a given software component type, where the given software component type is an aggregation of instances of a plurality of other software component types. The method includes promoting at least one of the instances of the plurality of other software component types to the given software component type.

In accordance with a further aspect of the present invention there is provided a visual tool for developing software. The visual tool is operable to promote a feature of an instance of a first software component type to a second software component type such that the feature may be customized in instances of the second software component type.

In accordance with a still further aspect of the present invention there is provided a computer readable medium containing computer-executable instructions which, when performed by a processor in a computer system for building software component types, cause the computer system to promote a feature of an instance of a first software component type to a second software component type such that the feature may be customized in instances of the second software component type.

In accordance with still another aspect of the present invention there is provided a method of promoting a given feature of an instance of a first software component type. The method includes receiving an indication of the given feature, receiving an indication of a second software component type to which to promote the given feature, creating a new feature for the second software component type and creating a link from the new feature to the given feature. In another aspect of the present invention, there is provided a visual tool for building software component types that may carry out this method. Further, there is provided a system for building a software component type that may carry out this method and a computer readable medium that may adapt a general purpose computer to carry out this method.

In accordance with a still further aspect of the present invention there is provided a first object for implementation by a computer in an object-oriented framework. The first object includes a first feature and a link adapted to relate the first feature of the first object to a second feature of a second object for implementation by the computer in the object-oriented framework.

In accordance with an even further aspect of the present invention there is provided a method of demoting a promoted feature, where the promoted feature is a new feature having a link to a given feature of an instance of a first software component type. The method includes receiving an indication of a second software component type including the promoted feature, receiving an indication of the promoted feature to demote, deleting the link from the new feature to the given feature and deleting the new feature.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DESCRIPTION OF THE PREFERRED EMBODIMENT

Figure 1:
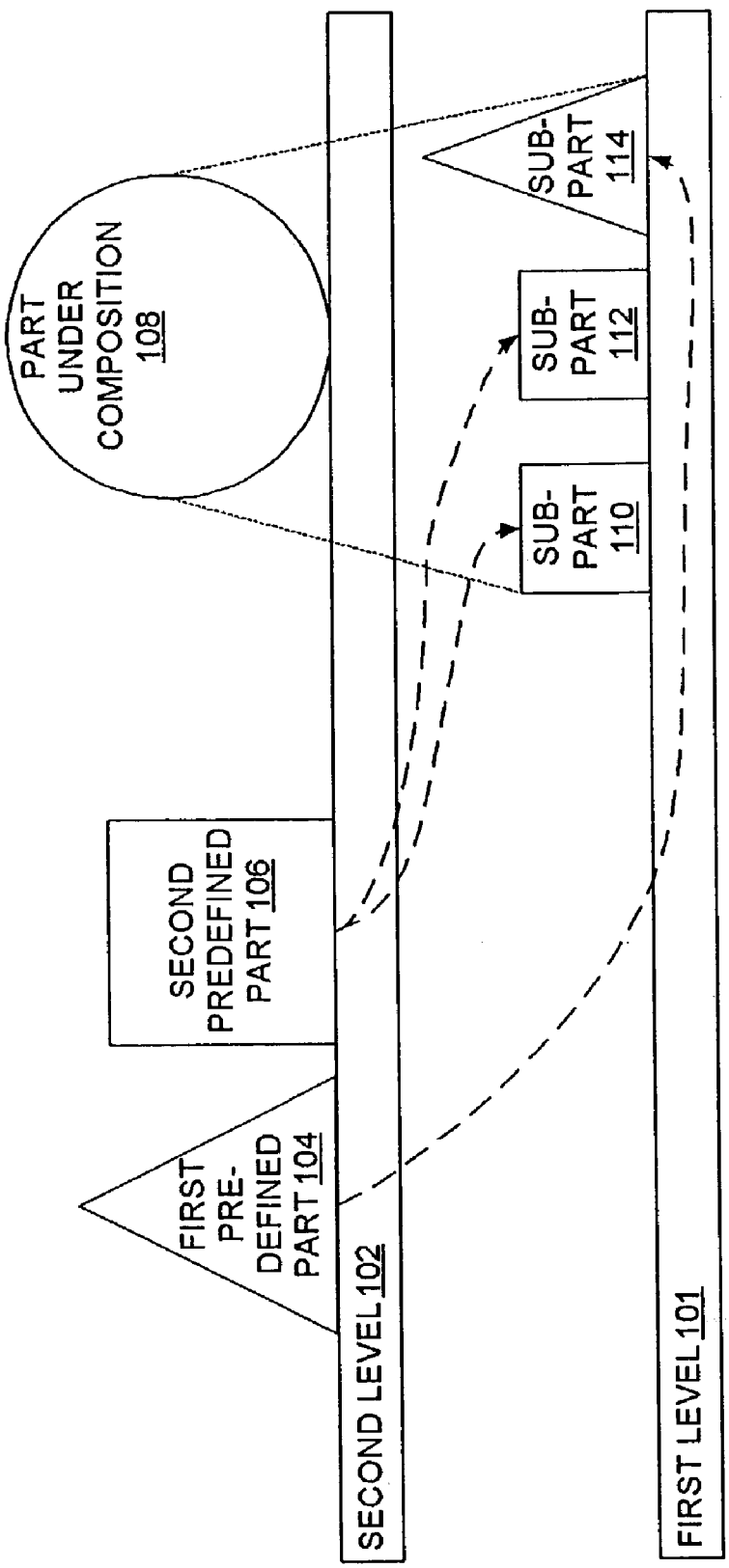
FIG. 1 illustrates a logical separation between a level of software component types and a level of instances of those software component types.

The logical representation illustrated in FIG. 1 presents a first level 101 for Sub-Parts and a second level 102 for Parts. On the second level 102 are a first predefined Part 104, a second predefined Part 106 and a Part under composition 108. On the first level 101 are Sub-Parts instantiated from the predefined Parts 104, 106 that are on the second level 102. In particular, there is a Sub-Part 114 instantiated from the first predefined Part 104 and two Sub-Parts 110, 112 instantiated from the second predefined Part 106. The Part under composition 108 is aggregated from the Sub-Parts 110, 112, 114 on the first level 101.

Although each instance of a given predetermined Part 104, 106 shares the same behavior, the instances (i.e., the Sub-Parts 110, 112,114) may be customized individually. As an example, if the second predetermined Part 106 had a property, or "feature", named "color", the two instances 110, 112 of the second predetermined Part 106 could be set to have different colors while aggregated in the Part under composition 108.

In a classic scenario, those features that may be customized are predefined and hard-coded. For example, where the second predetermined Part 106 was pre-constructed with a "color" feature, the user of the Part under composition 108 does not have the opportunity to define another feature for the Sub-Part 110 instantiated from the second predetermined Part 106 or remove the "color" feature from the Sub-Part 110. The user sets the value of the "color" feature, when instantiating the second predetermined Part 106, to a particular value, e.g., red, blue, etc. The Sub-Part 110 instantiated from the second predetermined Part 106 then has the particular value when the Part under composition 108 is instantiated.

Figure 2:
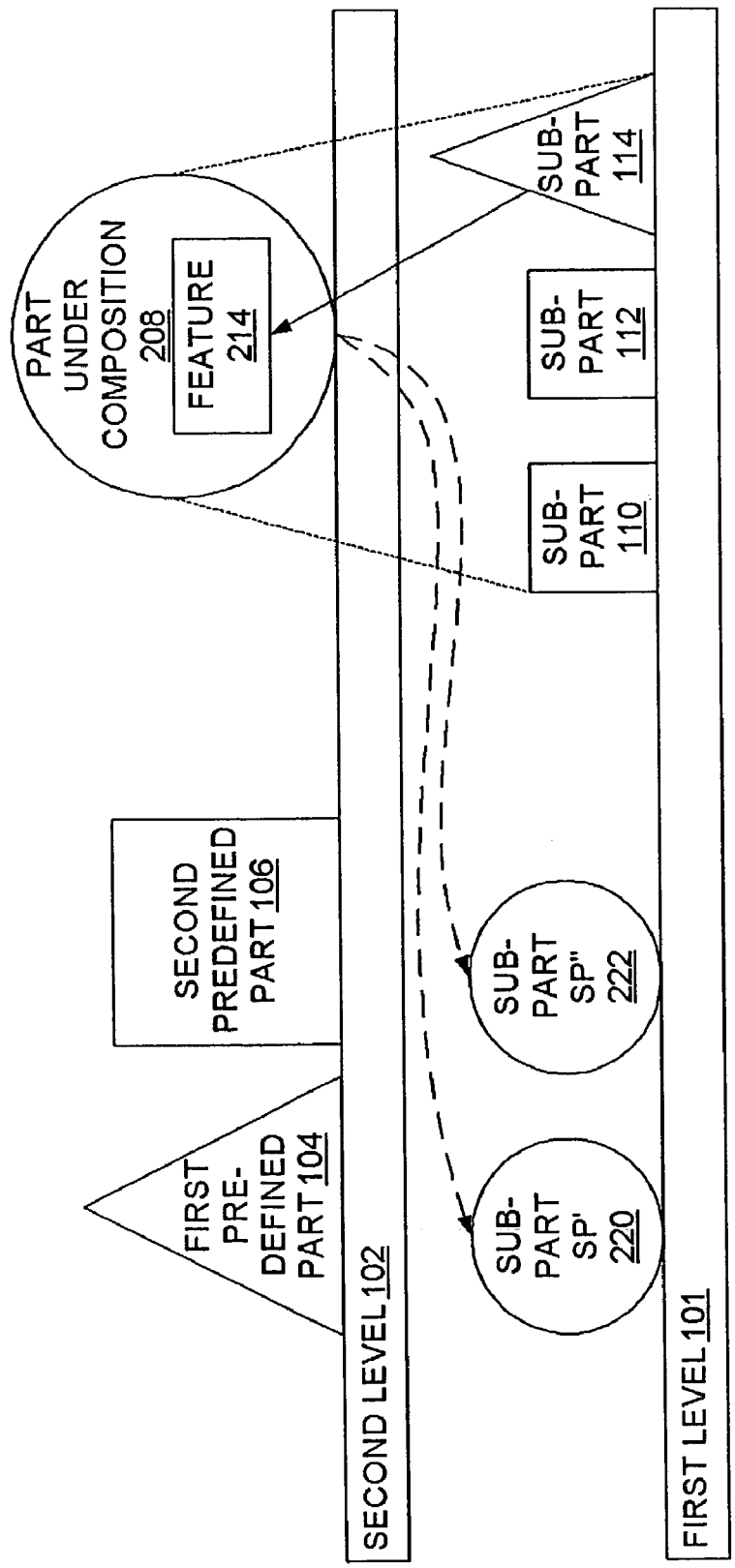
FIG. 2 logically illustrates a promotion of a feature from an instance of one software component type to a second software component type according to an embodiment of the present invention.

Herein, we propose a flexible schema, application of which is illustrated in FIG. 2. A given feature of a Sub-Part may be "promoted" to the level of the Part containing the given Sub-Part. After such a promotion, the given feature may be customized in instances of the containing Part. For example, we can have two instances of a Part under composition 208, say, a Sub-Part SP' 220 and a Sub-Part SP" 222 and a color feature 214 of the Sub-Part 114 may be promoted to the second level 102 according to en embodiment of the present invention. The Sub-Part SP' 220 maybe instantiated using the Sub-Part 114 instantiated from the first predefined Part 104 with its original color, say, grey. In contrast, the Sub-Part SP" 222 may be instantiated using the Sub-Part 114 instantiated from to first predefined Part 104 with the color feature set to red. Promotion of the color feature 214, from the Sub-Part 114, to the Part under composition 208 will allow this customization of the color feature 214.

To achieve this result, i.e., the Sub-Part SP' 220 and the Sub-Part SP" 222 with differently valued color features, using a classic scenario, the user would have had to define two Sub-Parts on the first level 101, one grey Sub-Part and one red Sub-Part. Subsequently, the user would compose two new Parts on the second level 102, each new Part composed through aggregation of one of the differently colored Sub-Parts on the first level 101 with other necessary Sub-Parts. Finally, a Sub-Part would be instantiated from each of the new Parts.

Advantageously, the present proposal allows a single Part (i.e., the Part under composition 208), which includes a promoted color feature 214, to satisfy a desire to customize a feature in instantiations of the Part under composition 208.

As will be apparent to a person skilled in the art, the feature called "color" used herein is merely an exemplary feature. Actual features available for promotion and customization will depend on the software component types under consideration.

Figure 3:
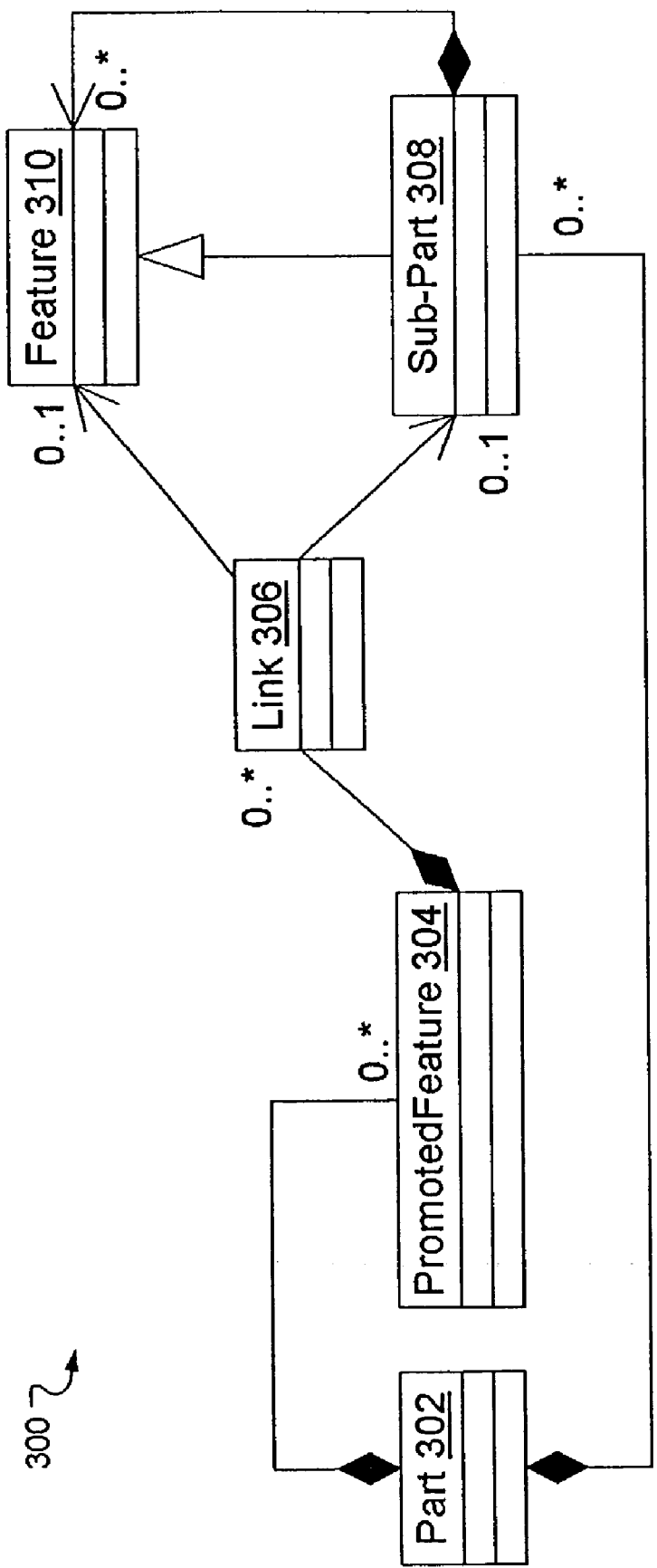
FIG. 3 illustrates an exemplary promotion model as a Unified Modeling Language diagram according to an embodiment of the present invention.

An exemplary promotion model is shown as a Unified Modeling Language (UML) diagram 300 in FIG. 3. FIG. 3 illustrates a UML schema using the standard nomenclature for UML as set out in, for example, Grady Booch, Ivar Jacobson, James Rumbaugh, "The Unified Modeling Language User Guide", Addison-Wesley, 1999, the contents of which are incorporated herein by reference.

In FIG. 3, each line symbolizes a relationship between objects. A line terminated in an open arrow denotes a "reference" relationship. Accordingly, a Link object 306 "references" a Sub-Part object 308. A line terminated in a filled diamond denotes a "containment" relationship. Numbers at the end of a line denote a multiplicity of the relationship. Accordingly, a PromotedFeature object 304 "contains" zero or more (0 . . . *) Link objects 306.

The promotion of a Feature object 310, as described above in conjunction with FIGS. 1 and 2, creates the PromotedFeature object 304. It may then be seen that a Part object 302 contains zero or more Sub-Part objects 308 and zero or more PromotedFeature objects 304.

More than one Feature object 310 may be promoted to the same PromotedFeature object 304. To handle this multiplicity, the PromotedFeature object 304 contains zero or more Link objects 306. Each Link object 306 maintains a reference to the Feature object 310 that is promoted. Additionally, the Link object 306 maintains a reference to the Sub-Part object 308 from which the Feature object 310 is promoted. Notably, the Sub-Part object 308 references the Feature object 310 and may, itself, be considered a Feature and thus promoted as a whole, since each Sub-Part object 308 is a Feature object 310. The fact that the Sub-Part object 308 is a Feature object 310 is denoted by the closed arrow relationship shown between the Sub-Part object 308 and the Feature object 310.

Figure 4:
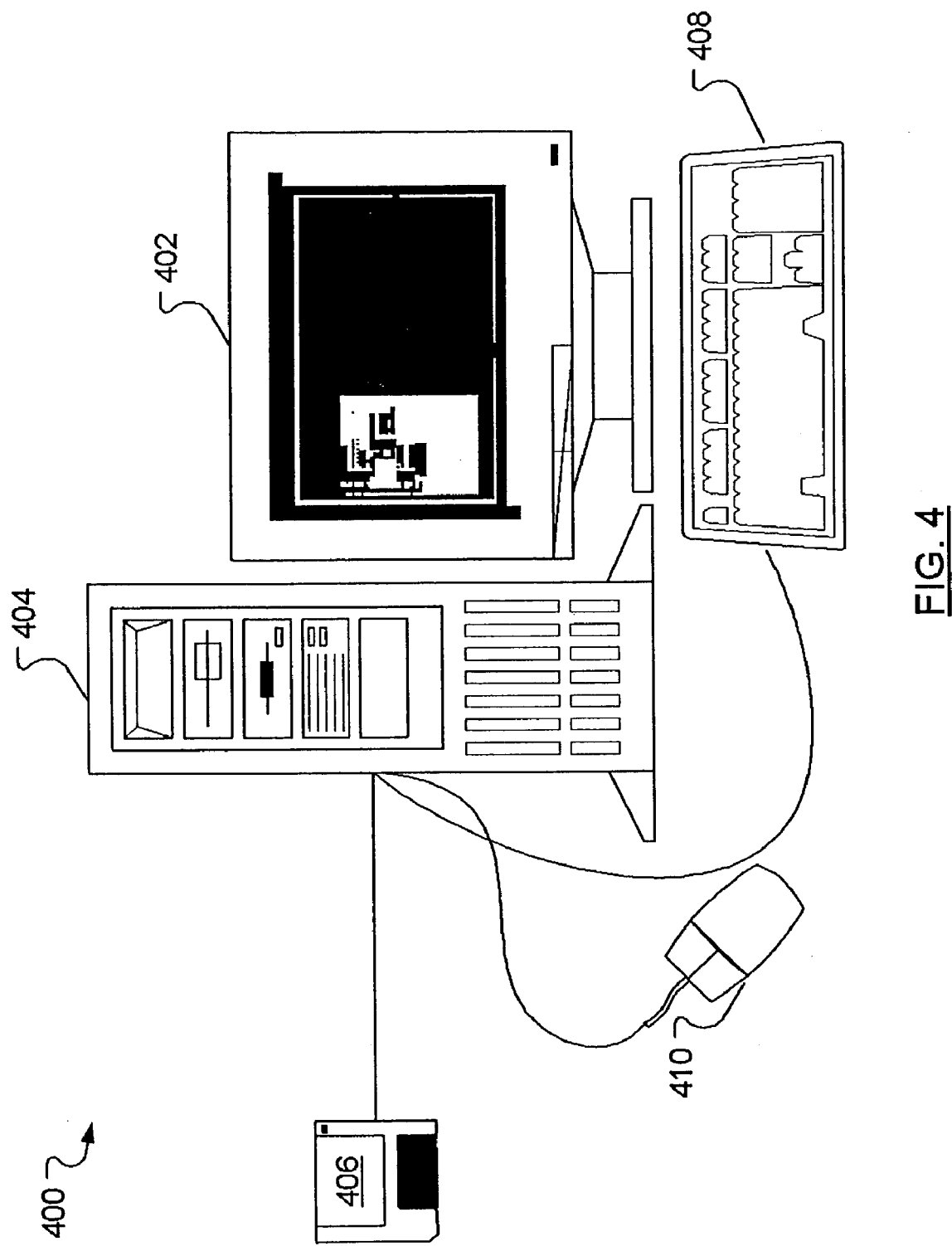
FIG. 4 illustrates a system for building software component types according to an embodiment of the present invention.

A software component type building system 400 is illustrated in FIG. 4. The software component type building system 400 includes a display monitor 402 and a central processing unit 404. The central processing unit 404 may include hardware to network with other computers, long term and short term memory and a processor. As is typical, connected to the central processing unit 404 may be multiple input peripherals such as a keyboard 408 and a mouse 410. The software component type building system 400 may be loaded with a visual tool (software component type building software) for executing methods exemplary of this invention from a software medium 406 which could be a disk, a tape, a chip or a random access memory containing a file downloaded from a remote source.

In overview, a visual software editing tool (say, a tool used in the system of FIG. 4), may be in use by a user for the purpose of building software component types. In order to build reusable software component types, the user selects features of instances of predetermined software component types and promotes the selected features to the software component types under composition using the tool.

As described in conjunction with FIG. 3, a (customizable) feature, in a software component type under composition, which has been promoted from an instance of a predetermined software component type, has a link to the (customized) feature in the instance of the predetermined software component type. Further, there is an inherent association between the instance of the predetermined software component type and the predetermined software component itself. When providing for customization of a promoted feature upon instantiation, the visual software editing tool relies upon the link to the feature in the instance of the predetermined software component type and upon the inherent association to the predetermined software component itself.

Figure 5:
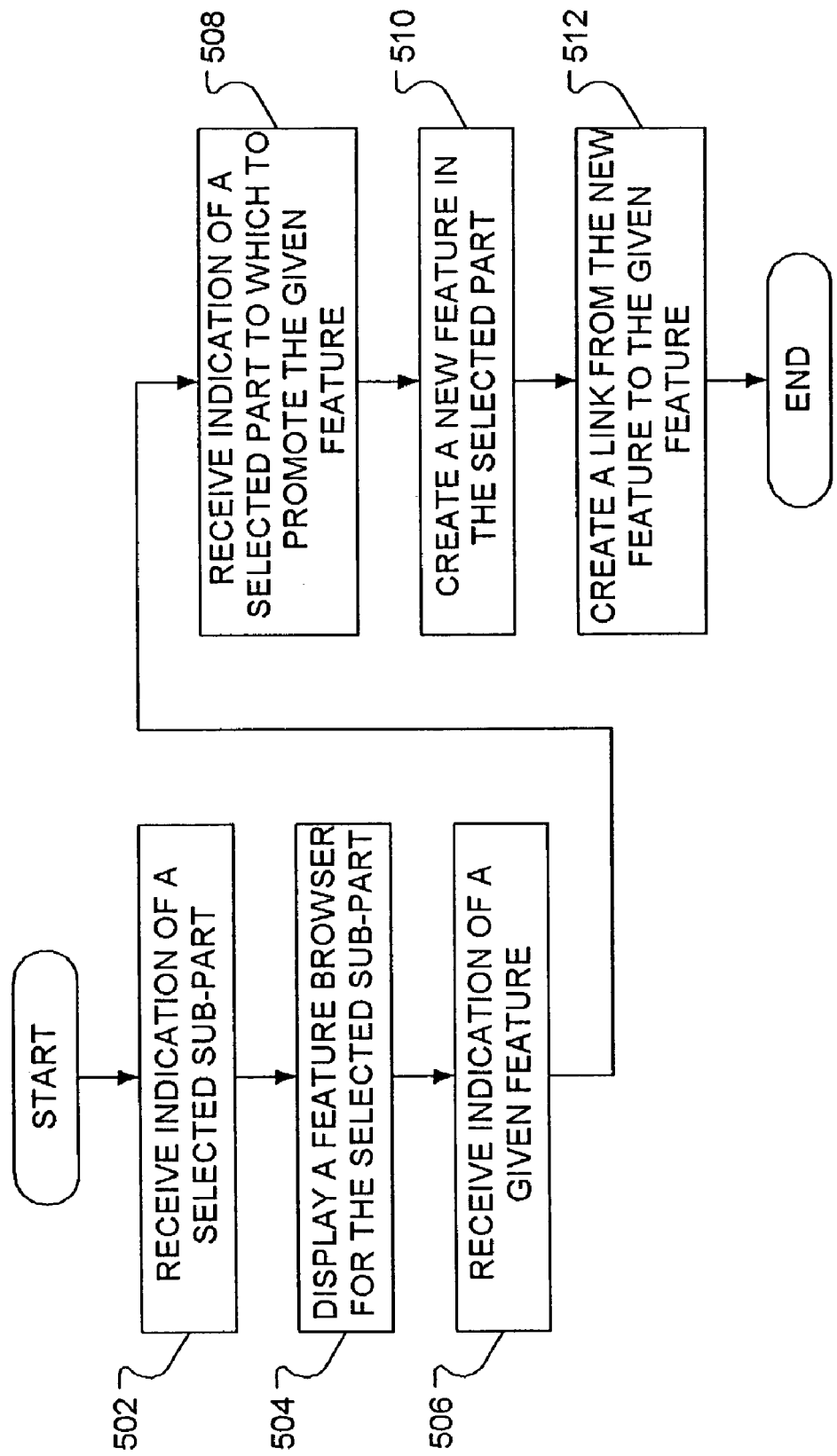
FIG. 5 illustrates steps of a feature promotion method according to an embodiment of the present invention.

In a visual editor that displays a Part, the user (hereinafter a "developer") selects a Sub-Part. The reaction of the visual editor is illustrated in FIG. 5. The visual editor receives an indication of the selected Sub-Part (step 502). Responsive to receiving this indication, the visual editor may present the developer with a browser (i.e., a browser may be "popped up", step 504) showing two category lists, titled "Features" and "Promoted Features". The browser shows all the features of the Sub-Part in the "Features" list. The developer can select a subset of the features, all the features or the whole Sub-Part and move the selected features to the "promoted features" list. The visual editor receives an indication of the selected features (step 506) and an indication of the selected Part to which to promote the selected features (step 508). The developer may then give the promoted features a name such that many features can be grouped together under the same name. Once a feature is moved to the promoted list, for each promoted feature, a PromotedFeature object is created and added to the Part object corresponding to the selected Part. Also, a Link object with references to the Sub-Part object corresponding to the selected Sub-Part and Feature objects corresponding to the selected features are created and initialized with the appropriate values. If more than one feature is promoted under the same named group of promoted features, then the named group of promoted features has multiple Link objects, one Link object for each promoted feature.

The promoted features will be shown, in the browser, as features of the selected Part. Therefore, in the visual editor, by selecting the Part, a browser is popped up and all the promoted features are shown. The developer can select and remove a subset or all features. Where the description thus far has concentrated on the promotion of features, such a removal of a feature may be considered a "demotion" of the feature. Feature demotion is another aspect of the visual editor incorporating the present invention. The removal of a promoted feature from the browser results the removal of the PromotedFeature object from the Part object corresponding to the selected Part and from the Link object.

Once a feature is promoted, the feature becomes a feature of the containing (selected) Part. In instances of this selected Part, the developer may set the value of this feature. Through the Link object 306, the original Feature object 310 (i.e., the feature that was promoted) may be located. In the case in which a PromotedFeature object 304 has multiple Link objects 306, a value set for the PromotedFeature object 304 is set for each of the original Feature objects 310 pointed to by each of the Link objects 306.

In an exemplary scenario, a Part, or software component type, may be built, called "A". Consider the software component type A to have a feature called "f". The software component type A may be used inside another software component type, called "B" (A in B is what may be called hierarchy), by creating an instance of the software component type A, called "anAinB". In the state of the art, one can customize the feature f in the instance anAinB by setting the value of the feature f at the time of instantiation.

According to an embodiment of the present invention, the feature f may be "promoted", that is, the feature f is "made" a feature of the software component type B. To "make" the feature f a feature of the software component type B requires that the software component type B be given a new feature, called f', and that a link be made from the feature f' of the software component type B to the feature f of the software component type A.

To perform the promotion, the developer may browse the features of any software component type instance and may select particular ones of the features for promotion. Conversely, the developer may "demote" a promoted feature, where demotion is the opposite of promotion.

Subsequently, another software component type, called "C", may be composed. An instance of the software component type B, called "aBinC", may be used when composing the software component type C. For the instance aBinC, the feature f may be customized by customizing the feature f'. Note that the link from the feature f' to the feature f indicates that the feature f' is a replacement for the feature f in the software component type C. Further note that, by customizing the feature f through the feature f', there is no need for the original feature f to change. Other software component types can use the software component type A with different values for the feature f. The process of promotion can continue. The feature f' can be promoted by creating a new feature f" of software component types C and creating a link from the feature f" to the feature f', and so on.

At the deployment (or run time) of the software built using the above methodology, there may be multiple ways of implementing (making use of) the promoted features. One way is to keep the structure created at development time and interpret the links. That is, an interpreter will interpret the values of the promoted features as being the actual values of the features pointed to by the Link objects. Another way of implementing the promoted features is to "inline" the Sub-Parts inside the containing Part with the values of the features being those in the promoted features. ("Inline" means that a software component is embedded inside a Part in contrast to the case wherein the software component resides somewhere else and the Part keeps a reference to the software component.) Again, the original features are identified by the Link objects.

Other modifications will be apparent to those skilled in the art and, therefore, the invention is defined in the claims.

We claim:

1. A computer-implemented method comprising:
    creating a part under composition by aggregating sub-parts, wherein the part under composition is an object oriented program (OOP) class, and wherein each of the sub-parts is an OOP object whose behavior and structure have been defined by an instantiating class from which the OOP object was instantiated, and wherein the instantiating class not a same class as the part under composition, and wherein when a value for a feature of a sub-part is initially hard-coded by the instantiating class and thus is initially non-modifiable;
    promoting the feature, from the sub-part to the part in composition, as a promoted feature, wherein the promoted feature is modifiable and thus is able to utilize a developer selected value for the promoted feature; and
    instantiating an instance of the part under composition using the developer selected value.

2. The computer-implemented method of claim 1, wherein multiple features are promoted into a same promoted feature, wherein the multiple features are customizable through a use of different values for the same promoted feature.

3. The computer-implemented method of claim 2, further comprising:
    utilizing a link object to maintain a reference to a non-promoted feature and a sub-part from which the non-promoted feature is later promoted, and wherein the link object maintains a containment for the same promoted feature.

4. The computer-implemented method of claim 1, further comprising:
    demoting the promoted feature back down to once again be a hard-coded and thus non-modifiable feature in the sub-part.

5. A computer-implemented method comprising:
    displaying a part under composition and at least one sub-part in a visual editor, wherein the part is an object oriented program (OOP) class and the sub-part is an OOP object whose behavior and structure have been defined by an instantiating class from which the OOP object was instantiated, and wherein the part under composition is created by aggregating sub-parts that have been instantiated by parts other than the part under composition;
    receiving a selection input for selecting a sub-part that is displayed in the visual editor;
    in response to receiving the selection input, displaying, in the visual editor, a browser showing two category lists, wherein, a first category list is of non-modifiable features of sub-part objects, and wherein a second category list is of modifiable promoted features that are derived from non-modifiable features;
    receiving a promotion input for selecting one or more of the non-modifiable features;
    in response to receiving the promotion input, moving selected non-modifiable features from the first list into the second list, wherein moving the selected non-modifiable features into the second list results in a logic causing the selected non-modifiable features to become modifiable features in the part under composition; and
    instantiating the part under composition with the promoted features using values, for the promoted features, that are set by a developer.

6. The computer-implemented method of claim 5, further comprising:
    grouping the selected non-modifiable features under a same name; and
    displaying the selected non-modifiable features under the same name in the part under composition.

7. The computer-implemented method of claim 5, further comprising:
    in response to receiving a demotion input, removing a promoted feature from the part under composition, wherein the removed promoted feature changes from being modifiable to non-modifiable in the part in composition.

8. A system comprising:
    a processor;
    a data bus coupled to the processor;
    a memory coupled to the data bus; and
    a computer-usable medium embodying computer program code, the computer program code comprising instructions executable by the processor and configured for:
    creating a part under composition by aggregating sub-parts, wherein the part under composition is an object oriented program (OOP) class, and wherein each of the sub-parts is an OOP object whose behavior and structure have been defined by an instantiating class from which the OOP object was instantiated, and wherein the instantiating class not a same class as the part under composition, and wherein when a value for a feature of a sub-part is initially hard-coded and thus non-modifiable;
    promoting the feature, from the sub-part to the part in composition, as a promoted feature, wherein the promoted feature is modifiable and thus is able to utilize a developer selected value for the promoted feature; and instantiating an instance of the part under composition using the developer selected value.

9. The system of claim 8, wherein multiple features are promoted into a same promoted feature, wherein the multiple features are customizable through a use of different values for the same promoted feature.

10. The system of claim 9, wherein the instructions executable by the processor are further configured for:
utilizing a link object to maintain, a reference to a non-promoted feature and a sub-part from which the non-promoted feature is later promoted, and wherein the link object maintains a containment for the same promoted feature.

11. The system of claim 8, wherein the instructions executable by the processor are further configured for:
demoting the promoted feature back down to once again be a hard-coded and thus non-modifiable feature in the sub-part.

12. A system comprising:
a processor;
a data bus coupled to the processor;
a memory coupled to the data bus; and
a computer-usable medium embodying computer program code, the computer program code comprising instructions executable byte processor and configured for:
displaying a part under composition and at least one sub-part in a visual editor, wherein the part is an object oriented program (OOP) class and the sub-part is an OOP object whose behavior and structure have been defined by an instantiating class from which the OOP object was instantiated, and wherein the part under composition is created by aggregating sub-parts that have been instantiated by parts other than the part under composition;
receiving a selection input for selecting a sub-part that is displayed in the visual editor;
in response to receiving the selection input, displaying, in the visual editor, a browser showing two category lists, wherein a first category list is of non-modifiable features of sub-part objects, and wherein a second category list is of modifiable promoted features that are derived from non-modifiable features;
receiving a promotion input for selecting one or more of the non-modifiable features;
in response to receiving the promotion input, moving selected non-modifiable features from the first list into the second list, wherein moving the selected non-modifiable features into the second list results in a logic causing the selected non-modifiable features to become modifiable features in the part under composition; and
instantiating the part under composition with the promoted features using values, for the promoted features, that are set by a developer.

13. The system of claim 12, wherein the instructions are further configured for:
grouping the selected non-modifiable features under a same name; and
displaying the selected non-modifiable features under the same name in the part under composition.

14. The system of claim 12, wherein the instructions are further configured for:
in response to receiving a demotion input, removing a promoted feature from the part under composition, wherein the removed promoted feature changes from being modifiable to non-modifiable in the part in composition.

15. A computer-readable medium embodying computer program code, the computer program code comprising computer executable instructions configured for:
creating a part under composition by aggregating sub-parts, wherein the part under composition is an object oriented program (OOP) class, and wherein each of the sub-parts is an OOP object whose behavior and structure have been defined by an instantiating class from which the OOP object was instantiated, and wherein the instantiating class not a same class as the part under composition, and wherein when a value for a feature of a sub-part is initially hard-coded and thus non-modifiable;
promoting the feature, from the sub-part to the part in composition, as a promoted feature, wherein the promoted feature is modifiable and thus is able to utilize a developer selected value for the promoted feature; and
instantiating an instance of the part under composition using the developer selected value.

16. The computer-readable medium of claim 15, wherein multiple features are promoted into a same promoted feature, wherein the multiple features are customizable through a use of different values for the same promoted feature.

17. The computer-readable medium of claim 16, wherein the computer executable instructions are further configured for:
utilizing a link object to maintain a reference to a non-promoted feature and a sub-part from which the non-promoted feature is later promoted, and wherein the link object maintains a containment for the same promoted feature.

18. The computer-readable medium of claim 15, wherein the computer executable instructions are further configured for:
demoting the promoted feature back down to once again be a hard-coded and thus non-modifiable feature in the sub-part.

19. A computer-readable medium embodying computer program code, the computer program code comprising computer executable instructions configured for:
displaying a part under composition and at least one sub-part in a visual editor, wherein the part is an object oriented program (OOP) class and the sub-part is an OOP object whose behavior and structure have been defined by an instantiating class from which the OOP object was instantiated, and wherein the part under composition is created by aggregating sub-parts that have been instantiated by parts other than the part under composition;
receiving a selection input for selecting a sub-part that is displayed in the visual editor;
in response to receiving the selection input, displaying, in the visual editor, a browser showing two category lists, wherein a first category list is of non-modifiable features of sub-part objects, and wherein a second category list is of modifiable promoted features that are derived from non-modifiable features;
receiving a promotion input for selecting one or more of the non-modifiable features;
in response to receiving the promotion input moving selected non-modifiable features from the first list into the second list, wherein moving the selected non-modifiable features into the second list results in a logic causing the selected non-modifiable features to become modifiable features in the part under composition; and instantiating the pan under composition with the promoted features using values, for the promoted features, that are set by a developer.

20. The computer-readable medium of claim 19, wherein the computer executable instructions are further configured for:

grouping the selected non-modifiable features under a same name; and displaying the selected non-modifiable features under the same name in the part under composition.

* * * * *